United States Patent
Brown

(10) Patent No.: US 10,173,495 B2
(45) Date of Patent: Jan. 8, 2019

(54) MODULAR HVAC SYSTEM FOR ENGINE-ON AND ENGINE-OFF OPERATION

(71) Applicant: AIR INTERNATIONAL (US) Inc., Auburn Hills, MI (US)

(72) Inventor: Jeffrey Paul Brown, Dearborn, MI (US)

(73) Assignee: AIR INTERNATIONAL (US) INC., Auburn Hills, MI (US)

( * ) Notice: Subject to any disclaimer, the term of this patent is extended or adjusted under 35 U.S.C. 154(b) by 445 days.

(21) Appl. No.: 14/947,520

(22) Filed: Nov. 20, 2015

(65) Prior Publication Data

US 2016/0144692 A1    May 26, 2016

Related U.S. Application Data

(60) Provisional application No. 62/082,284, filed on Nov. 20, 2014.

(51) Int. Cl.
*B60H 1/32* (2006.01)

(52) U.S. Cl.
CPC ... *B60H 1/3226* (2013.01); *B60H 2001/3292* (2013.01)

(58) Field of Classification Search
CPC ............. B60H 1/3226; B60H 2001/3292
USPC ................................... 62/89, 133
See application file for complete search history.

(56) References Cited

U.S. PATENT DOCUMENTS

| | | | | |
|---|---|---|---|---|
| 3,885,398 A | * | 5/1975 | Dawkins | B60H 1/3204 62/89 |
| 3,976,458 A | * | 8/1976 | Krug | B60D 1/242 62/175 |
| 3,984,224 A | * | 10/1976 | Dawkins | B60H 1/3204 62/89 |
| 4,762,170 A | * | 8/1988 | Nijjar | B60H 1/00421 123/142.5 R |
| 5,184,474 A | * | 2/1993 | Ferdows | B60H 1/00371 62/244 |
| 5,222,372 A | * | 6/1993 | DeRees | B60H 1/0005 62/237 |
| 5,333,678 A | * | 8/1994 | Mellum | B60H 1/00378 122/26 |
| 5,718,375 A | * | 2/1998 | Gerard | B60H 1/00371 237/12.3 R |
| 5,871,041 A | * | 2/1999 | Rafalovich | B60H 1/00492 165/10 |
| 6,655,163 B1 | * | 12/2003 | Scherer | B60H 1/00007 165/203 |
| 6,932,148 B1 | * | 8/2005 | Brummett | B60H 1/00378 123/142.5 R |
| 6,988,670 B2 | * | 1/2006 | Keen | B60H 1/00792 165/43 |
| 7,150,159 B1 | * | 12/2006 | Brummett | B60H 1/00378 62/236 |
| 7,171,822 B2 | * | 2/2007 | Allen | B60H 1/00378 62/298 |

(Continued)

*Primary Examiner* — Ljiljana Ciric
*Assistant Examiner* — Kristin Oswald
(74) *Attorney, Agent, or Firm* — Carlson, Gaskey & Olds, P.C.

(57) ABSTRACT

An auxiliary HVAC system includes an engine-on module configured to provide cooling or heating during an engine-on mode and an engine-off module connected to the engine-on module and configured to provide cooling or heating during an engine-off mode.

12 Claims, 10 Drawing Sheets

(56) References Cited

U.S. PATENT DOCUMENTS

| | | | |
|---|---|---|---|
| 7,237,397 B2* | 7/2007 | Allen | B60H 1/00378 62/236 |
| 7,259,469 B2* | 8/2007 | Brummett | B60H 1/3226 165/202 |
| 7,316,119 B2* | 1/2008 | Allen | B60H 1/00378 62/236 |
| 8,141,377 B2* | 3/2012 | Connell | B60H 1/00378 62/239 |
| 9,062,887 B2* | 6/2015 | Montminy | B64F 1/364 |
| 2004/0093880 A1* | 5/2004 | Zheng | B60H 1/3214 62/199 |
| 2004/0094294 A1* | 5/2004 | Zheng | B60H 1/00885 165/203 |
| 2005/0035657 A1* | 2/2005 | Brummett | B60H 1/3226 307/10.1 |
| 2005/0210903 A1* | 9/2005 | Allen | B60H 1/00378 62/244 |
| 2006/0124275 A1* | 6/2006 | Gosse | B60H 1/00421 165/42 |
| 2008/0006045 A1* | 1/2008 | Brummett | B60H 1/3226 62/236 |
| 2008/0134715 A1* | 6/2008 | Lewis | B60H 1/2209 62/498 |
| 2009/0211280 A1* | 8/2009 | Alston | B60H 1/00428 62/231 |
| 2010/0106304 A1* | 4/2010 | Wawer | B60H 1/0065 700/275 |
| 2016/0144692 A1* | 5/2016 | Brown | B60H 1/3226 62/89 |

* cited by examiner

Cover on　　　　Cover off

MODULAR HVAC SYSTEM FOR ENGINE-ON AND ENGINE-OFF OPERATION

CROSS REFERENCE TO RELATED APPLICATION

This application claims priority to U.S. Provisional Application No. 62/082,284 which was filed on Nov. 20, 2014.

BACKGROUND

This disclosure relates to an HVAC system, and more particularly to a modular HVAC system including an engine-on HVAC module and an engine-off HVAC module.

Modern trucks can require auxiliary HVAC systems that operate as either an "engine-on" HVAC system or an "engine-on/off" HVAC system. Installation of the latter typically requires disposal of the former Improvements in this field of technology are desired.

SUMMARY

An auxiliary HVAC system according to an example of the present disclosure includes an engine-on module configured to provide cooling or heating during an engine-on mode and an engine-off module connected to the engine-on module and configured to provide cooling or heating during an engine-off mode.

A further embodiment of any of the foregoing embodiments includes a fan assembly disposed in the engine-on module with an engine-on evaporator fluidly downstream of the fan assembly configured to operate during the engine-on mode and an engine-off evaporator fluidly downstream of the fan assembly and configured to operate during the engine-off mode.

In a further embodiment of any of the foregoing embodiments, the engine-on evaporator and the engine-off evaporator are disposed within an evaporator housing in the engine-on module.

In a further embodiment of any of the foregoing embodiments, the engine-on module includes discharge openings.

A further embodiment of any of the foregoing embodiments includes an engine-off compressor disposed within the engine-off module. The engine-off compressor is in fluid communication with the engine-off evaporator through a suction line.

In a further embodiment of any of the foregoing embodiments, the engine-on module includes an engine-on outer housing while the engine-off module includes an engine-off outer housing. At least a portion of the suction line is outside of both the engine-off outer housing and the engine-on outer housing.

In a further embodiment of any of the foregoing embodiments, the engine-off module comprises, within an engine-off outer housing, a condenser and a compressor configured to be powered by an electric power source during engine-off mode.

In a further embodiment of any of the foregoing embodiments, the engine on module comprises, within an engine-on outer housing, a fan assembly, an engine-on evaporator and an engine-off evaporator. The fan assembly and the engine-off evaporator are configured to be powered by the electric power source during engine-off mode.

In a further embodiment of any of the foregoing embodiments, the path of conditioned air is the same for engine-on mode and engine-off mode.

A method of providing HVAC to a vehicle according to an example of the present disclosure includes providing air to a vehicle cabin with an engine-on module during an engine-on mode. Thus, providing air to the vehicle cabin with and engine-off module during an engine-off mode. The engine-on module and the engine-off module are connected together as a modular link.

In another example embodiment of the above described method, the engine-on module includes an engine-off evaporator in refrigerant fluid communication with the engine-off module and the engine-off evaporator is configured to operate during engine-off mode.

In another example embodiment of any of the above described methods, the engine-off module is bracketed to the engine-on module.

In another example embodiment of any of the above described methods, the engine-off module includes an engine-off outer housing, a condenser, and a compressor to be powered by an electric power source during engine-off mode.

In another example embodiment of any of the above described methods, the engine-on module includes and engine-on outer housing, a fan assembly, engine-on evaporator, and an engine-off evaporator. While the can assembly and the engine-off evaporator are configured to be powered by the electric power source during engine-off mode.

In another example embodiment of any of the above described methods, the engine-off module is connected to an electric power source.

In another example embodiment of any of the above described methods, the engine-on module is disposed underneath a bed surface of a sleeping/bunk area of a vehicle.

BRIEF DESCRIPTION OF THE DRAWINGS

The various features and advantages of this disclosure will become apparent to those skilled in the art from the following detailed description. The drawings that accompany the detailed description can be briefly described as follows.

DETAILED DESCRIPTION

Figure 1:
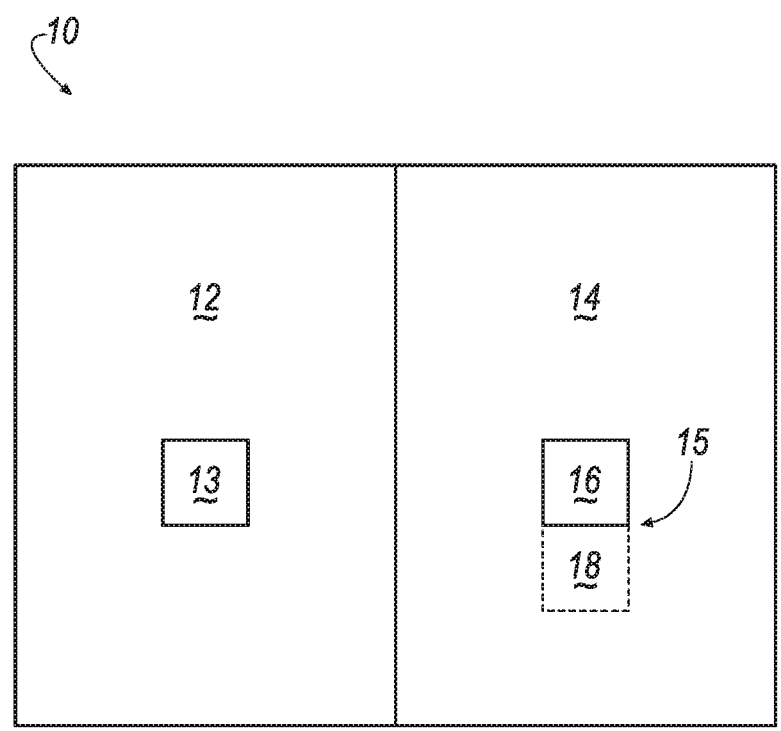
FIG. 1 schematically illustrates a vehicle having an HVAC system.

FIG. 1 schematically illustrates a vehicle 10 including an engine area 12 and a cabin area 14. The engine area 12 is the engine bay of vehicle 10 and includes the vehicle engine 13.

The cabin area 14 generally includes the passenger and sleeper/bunk compartments of the vehicle 10.

Figure 2:
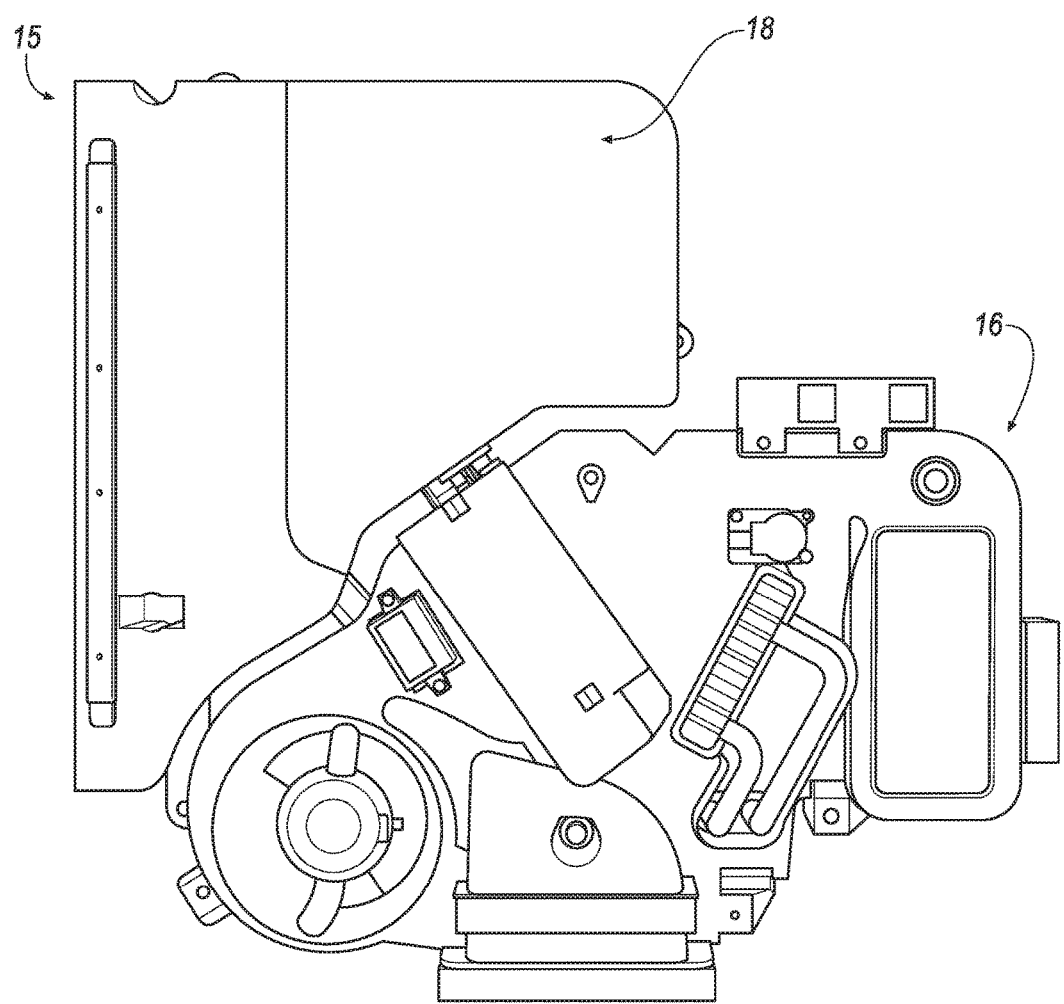
FIG. 2 illustrates a top view of an example engine-on module and an example engine-off module.

The cabin area 14 includes an auxiliary HVAC system 15 including an engine-on module 16 for heating and cooling the vehicle when the vehicle engine 13 is on (engine-on mode). The auxiliary HVAC system 15 may also include an engine-off module 18 for heating and cooling the vehicle when the vehicle engine 13 is off (engine-off mode). In one embodiment, the engine-on module 16 and the engine-off module 18 are connected together as a modular unit, as shown in FIG. 2. The modular nature of HVAC system 15 allows a vehicle customer to choose to add the engine-off module 18 to an existing engine-on module 16 at any time.

Figure 3:
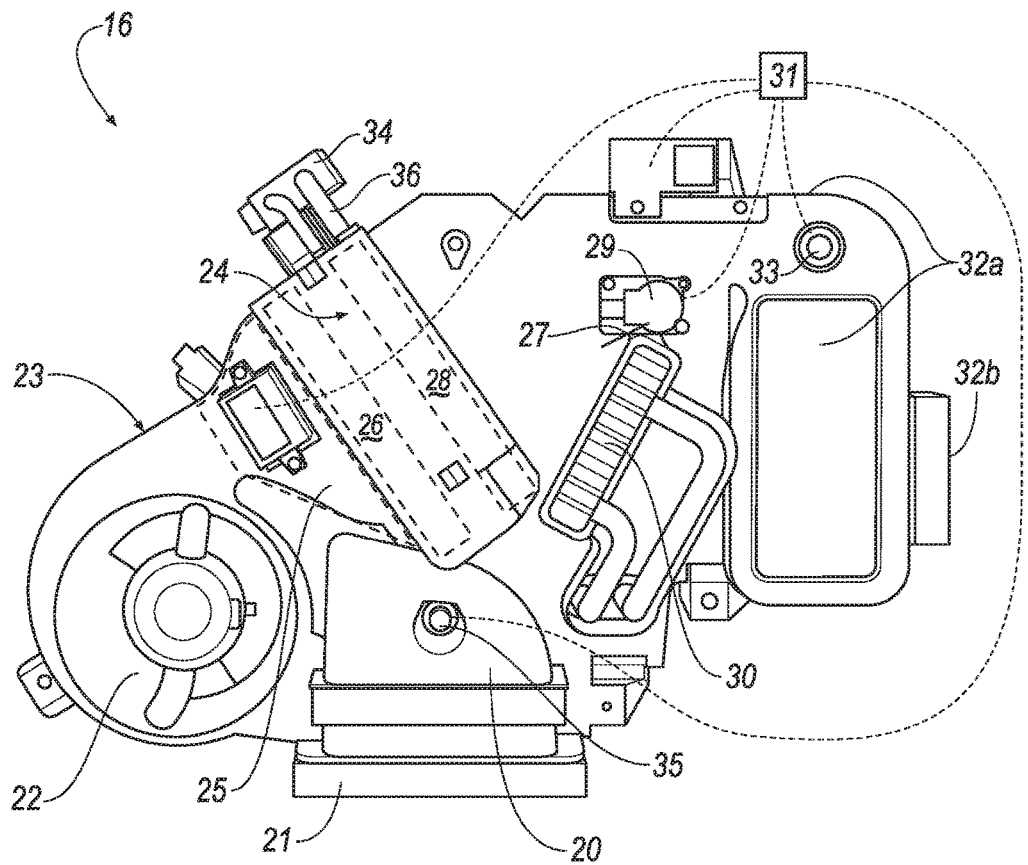
FIG. 3 illustrates a top view of the example engine-on module.

FIG. 3 illustrates an example engine-on module 16 of the HVAC system 15. In one embodiment, the engine-on module 16 includes a filter assembly 20, a fan assembly 22, and an outer housing 23 including evaporator housing 24. The evaporator housing 24 houses an engine-on evaporator 26 for receiving refrigerant when the engine is on and may also receive an engine-off evaporator 28 for receiving refrigerant when the engine is off. That is, the refrigerant circuits for engine-on and engine-off operation are separate, in one embodiment.

During engine-on mode, air is pulled in through inlet 21 and is filtered across filter assembly 20 to the fan assembly 22. The fan assembly 22 directs air through expansion diffuser 25 (part of housing 23) and across the engine-on evaporator 26, which absorbs heat and condenses moisture from the air. The air may then be directed across heater core 30, which heats the air, or directly out of the discharge openings 32a, 32b, depending on the desired temperature selected by a user. The air path is controlled by air mix door 27 driven by actuator 29, which in one embodiment is an electro-mechanical actuator controlled by a controller 31 (shown schematically). The air mix door 27 controls the amount of air directed across the heater core 30, ranging from 0-100%.

Figure 6:
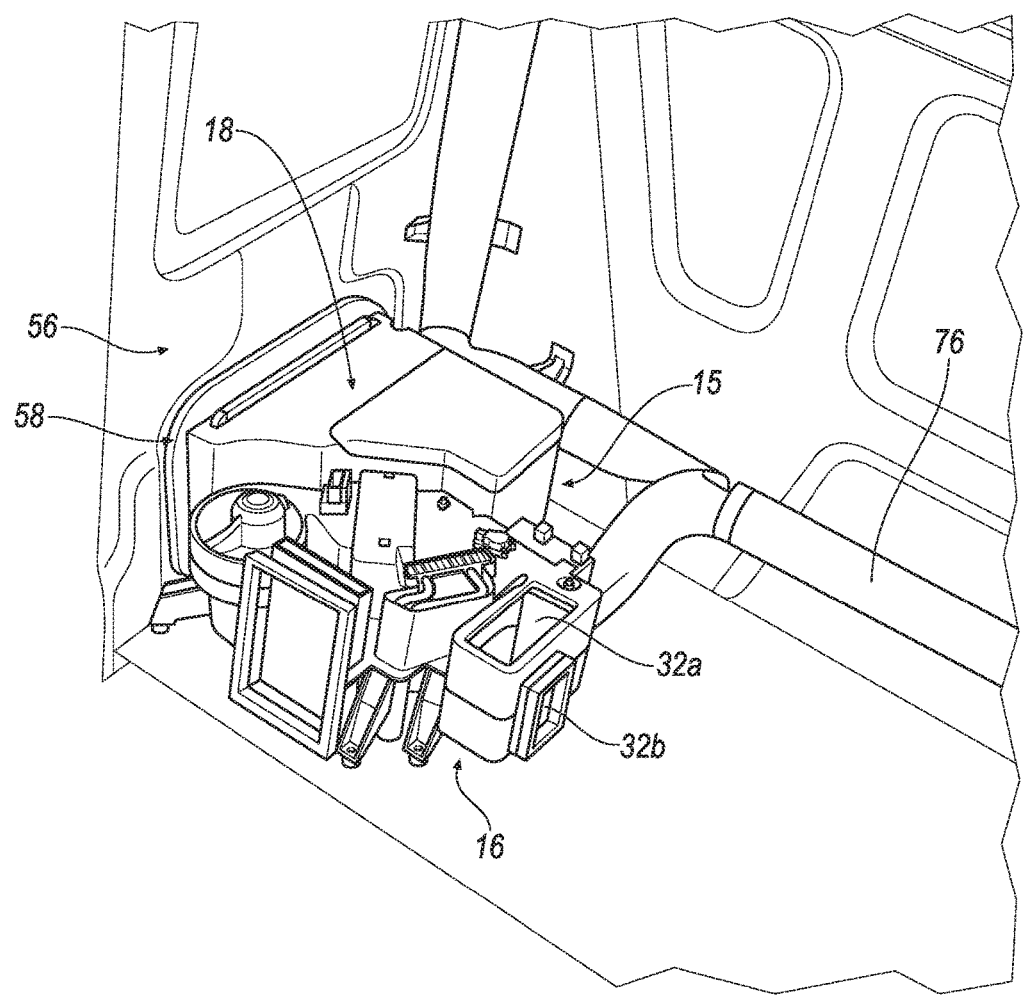
FIG. 6 illustrates a perspective view of the example engine-on module and example engine-off module in the example sleeper bunk of FIG. 5.

Various configurations for the discharge openings 32a, 32b are contemplated, depending on the customer's needs. The discharge openings 32a are potential locations (top or rear of the engine-on module 16) for discharge into an air duct (shown in FIG. 6) in communication with the passenger compartment of the cabin area 14, for example. Some applications will only use one of the top or rear locations for the discharge opening 32a. Discharge opening 32b, located at the side of the engine-on module 16, may be connected to a discharge louver.

In one example, an outlet air temperature sensor 33 is located adjacent to discharge openings 32a, 32b for measuring the temperature of the discharged air. An inlet air temperature sensor 35 may be located adjacent the inlet 21 for measuring the temperature of the input air. The outlet air temperature sensor 33 and the inlet air temperature sensor 35 are in communication with the controller 31, which adjusts the auxiliary HVAC system 15 accordingly (shown schematically).

The engine-off evaporator 28 is connected to a thermal expansion valve 34 through evaporator piping 36. The thermal expansion valve 34 is disposed outside of the outer housing 23 and evaporator housing 24 and serves as the refrigerant interface between the engine-on module 16 and the engine-off module 18.

In one embodiment, the fan assembly 22, the engine-on evaporator 26, the engine-off evaporator 28 the air mix door 27, and the heater core 30 are within the engine-on module housing 23.

Figure 4:
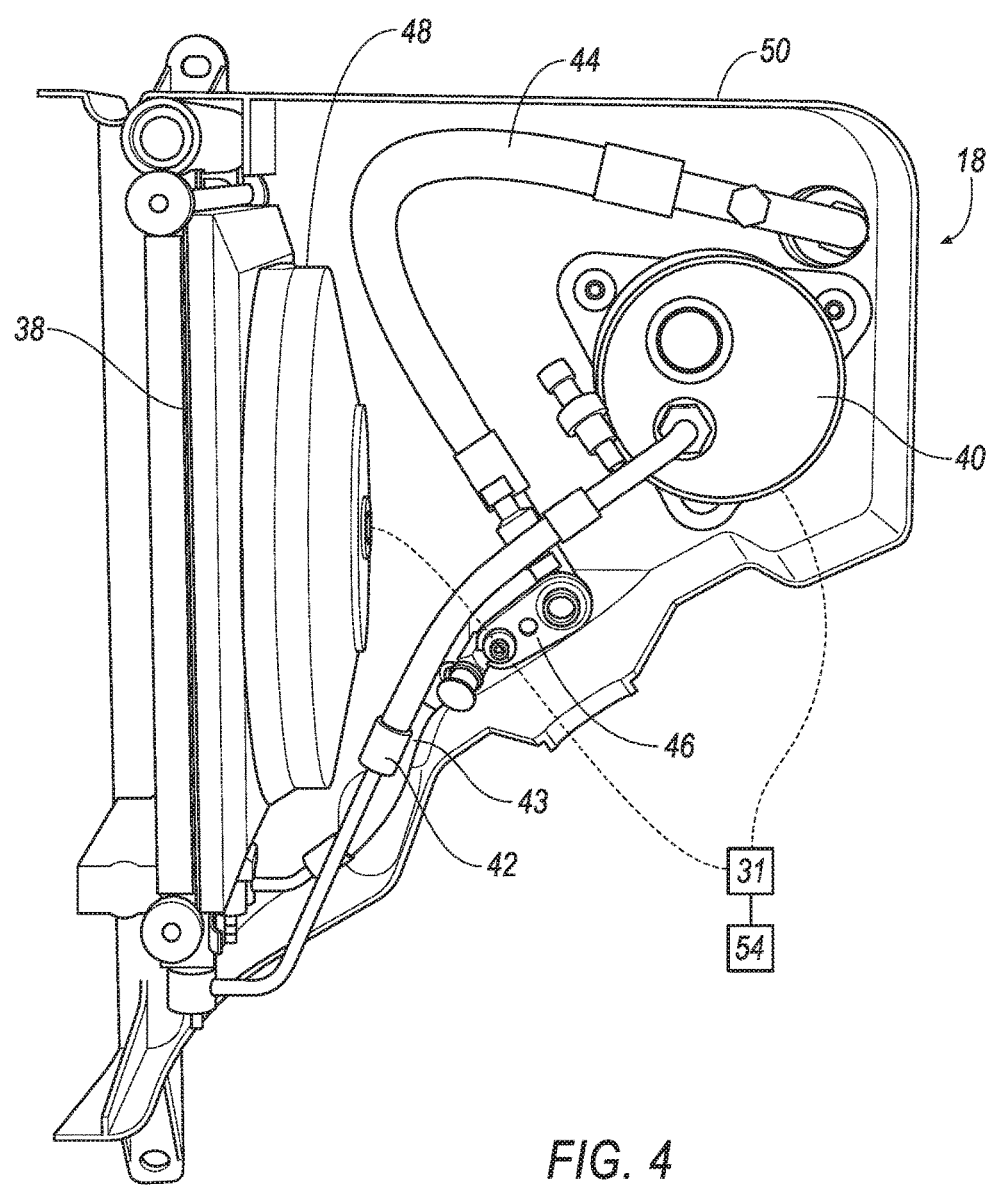
FIG. 4 illustrates an interior view of the example engine-off module.
Figure 5:
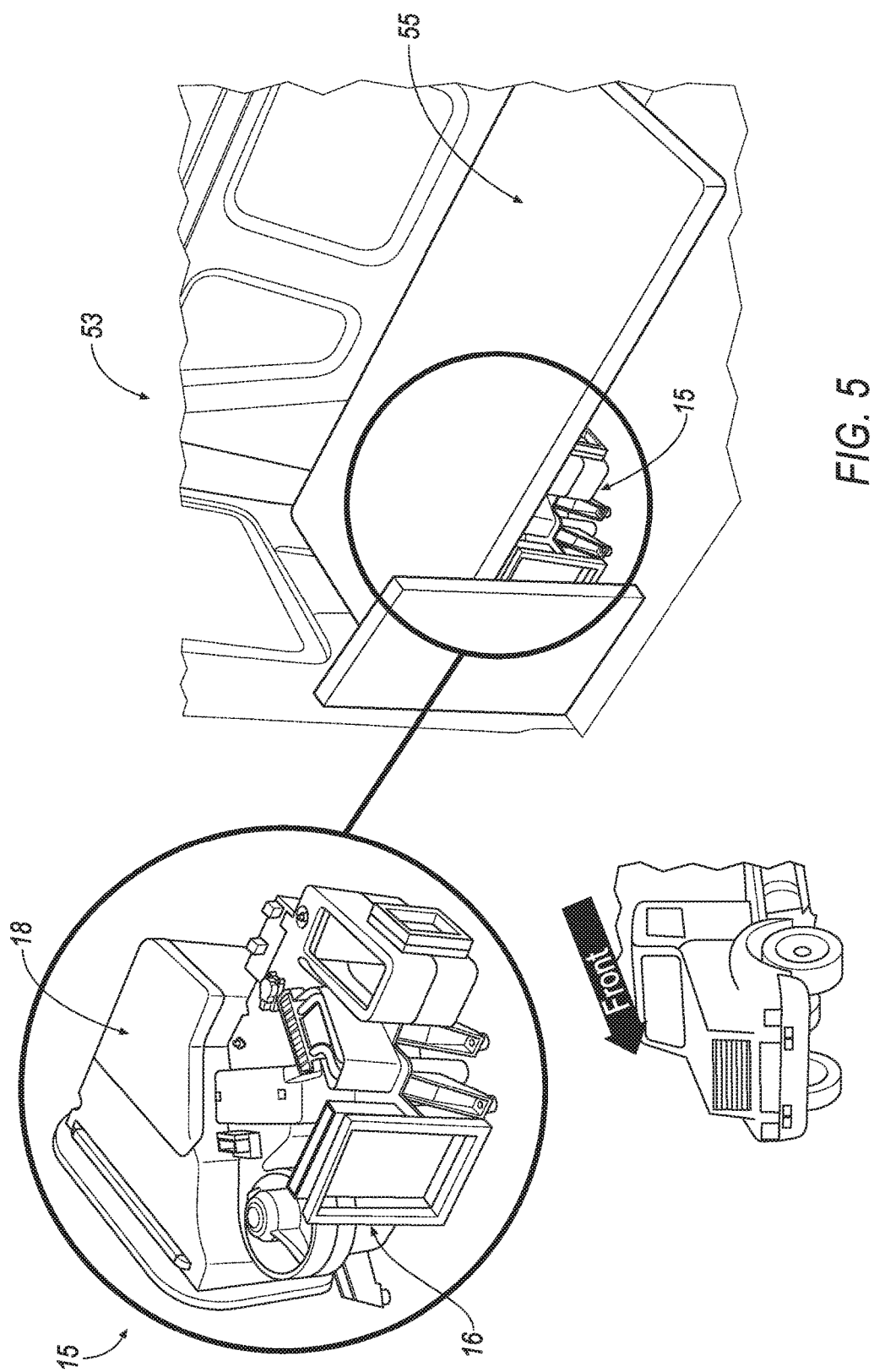
FIG. 5 illustrates an example sleeper/bunk area of a vehicle.

FIG. 4 illustrates an example engine-off module 18 of the auxiliary HVAC system 15. The engine-off module 18 includes a condenser 38 connected with an electrically powered compressor assembly 40 through discharge hose assembly 42. The compressor assembly 40 is connected with the engine-off evaporator 28 (see FIG. 3) through suction line 44, which is connected to thermal expansion valve 34 at expansion valve connection 46. The thermal expansion valve 34 is connected to the expansion valve connection 46 through an opening in housing 50. The condenser 38 is in communication with the engine-off evaporator 28 through liquid line hose 43 connected to the thermal expansion valve 34 at expansion valve connection 46.

The condenser 38, condenser cooling fan 48, and the compressor assembly 40 are controlled by the system controller 31 and are powered by electric power source 54, as shown schematically in FIG. 4. The example power source 54 may be the vehicle battery or any other power source.

Because, in one example, the engine-off evaporator 28 is located within the engine-on module 16, some components of the engine-on module 16 are used in both engine-on and engine-off operation, including the filter assembly 20, the fan assembly 22, the expansion diffuser 25, the air mix door 27, the actuator 29, the heater core 30, the outlet air temperature sensor 33, the inlet air temperature sensor 35, the discharge openings 32a, 32b, and the controller 31. Thus, the airflow path for cabin conditioning described above for engine-on mode is the same for engine-off mode, except that engine-off evaporator 28 absorbs heat and condenses moisture from the air. That is, the airflow path for cabin conditioning is within the engine-on module 16 for both engine-on mode and engine-off mode. The electric power source 54 may therefore be configured to provide power during engine-off mode to the fan assembly 22, the actuator 29, the heater core 30, the outlet air temperature sensor 33, and inlet air temperature sensor 35, The condenser 38, compressor assembly 40, discharge hose assembly 42, liquid line hose 43, suction line 44, and condenser cooling fan 48 of engine-off module 18 are enclosed within housing 50 to house the components of the engine-off module 18. In this example, the housing 50 is separate from the outer housing 23 of the engine-on module 16.

The system controller 31 and associated wire harnesses and fuse and relay centers are also modular. The engine-on module 16 and the engine-off module 18 each have their own harnesses and fuse and relay centers, which can be connected together. When the engine-off module 18 is added, the controller 31 will receive a software update (flash).

The modular design of engine-off module 18 allows for addition of the engine-off module 18 to an existing engine-on module 16 (see FIG. 2) and to be simply connected at thermal expansion valve 34. In one embodiment, the engine-on module 16 and the engine-off module 18 are held together by a series of brackets. The housing 50 may be bracketed to the housing 23. The engine-off evaporator 28 may be pre-installed in the engine-on module 16 or may be added at a later time. Thus, the engine-on module 16 is fully capable of operating without installation of engine-off evaporator 28 or engine-off module 18. As one alternative, a single dual circuit evaporator is contemplated.

Referring now to FIGS. 5-8, the auxiliary HVAC system 15 may be installed underneath a bed surface 55 of a sleeping/bunk area 53 of a vehicle, such as a heavy duty truck. This is one example location, and other locations are contemplated. The sleeping/bunk area 53 is part of the cabin area 14 (See FIG. 1), but separate from a driving area of the cabin area 14 where the vehicle driver sits while operating the vehicle. The driving area and sleeping/bunk area are often separated by a curtain. The example auxiliary HVAC system 15 is configured to provide conditioned air to the sleeper/bunk area 53, while a separate front HVAC system (not shown) provides conditioned air to the driving area.

Figure 8:
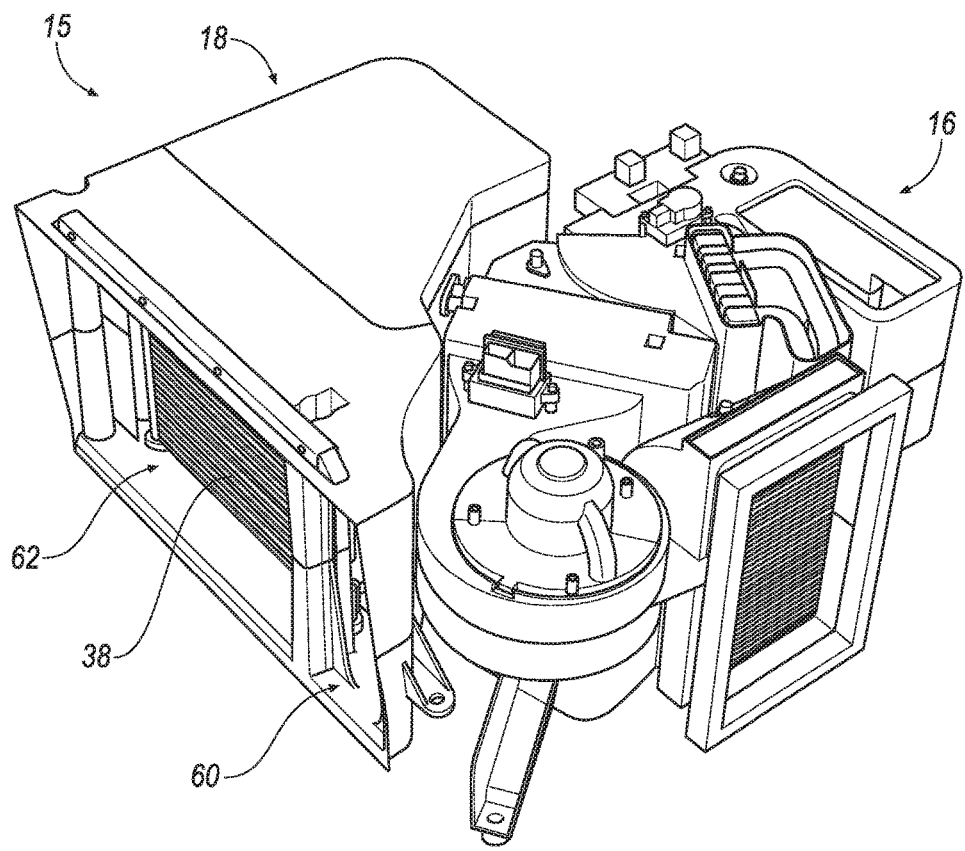
FIG. 8 illustrates a perspective view of the example engine-on module and the example engine-off module.

The engine-off module 18 is positioned against a side panel 56 which includes an opening 58 through which the engine-off module 18 receives and discharges air. The engine-off module 18 may also be serviced through the opening 58 in side panel 56. Thus, as illustrated in FIG. 8, the engine-off module 18 includes an air inlet 60 through which the condenser fan 48 pulls air into the engine-off module 18. The engine-off module 18 further includes discharge opening 62, through which hot air can be discharged across condenser 38 and out of engine-off module 18 to ambient.

Figure 7:
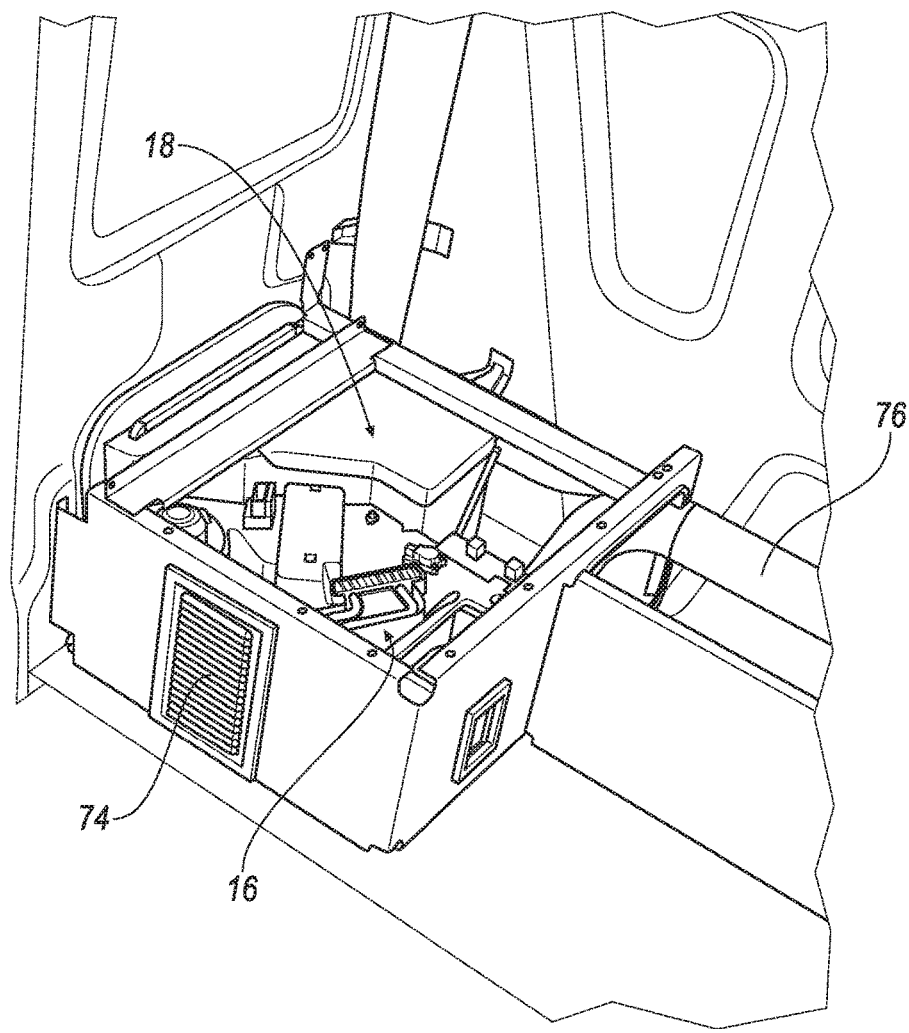
FIG. 7 illustrates a perspective view of the example engine-on module and example engine-off module in the example sleeper bunk including an example inlet grille.

Referring to FIGS. 3 and 7, the engine-on module 16 may receive air from the sleeping bunk area 53 through inlet grille 74. The air is discharged through at least one of the discharge openings 32a, which may be in communication with the passenger compartment vehicle cabin 14 through the duct system 76. Air may also be discharged through discharge opening 32b, which may be in communication with sleeping bunk area 53.

Figure 9:
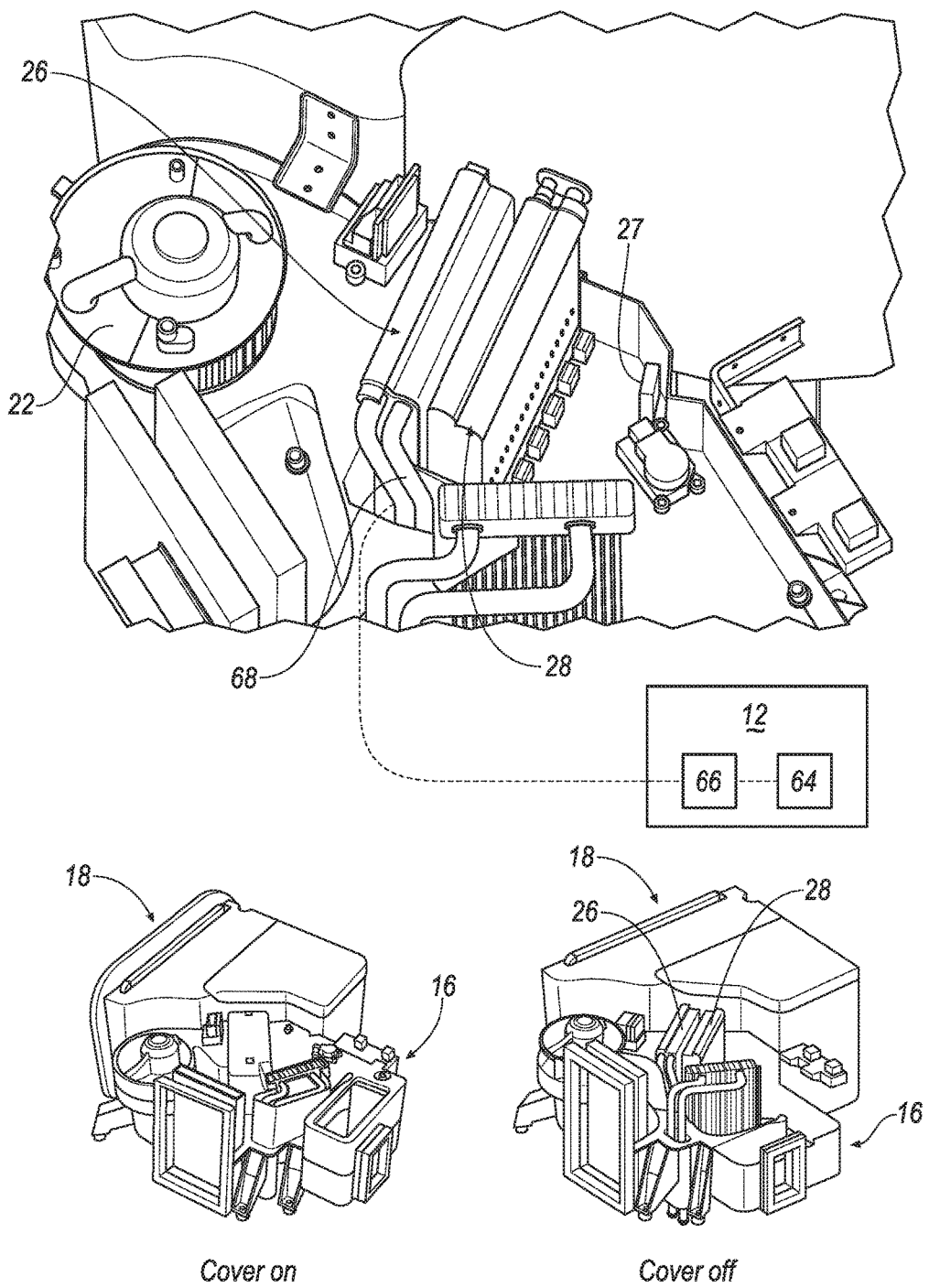
FIG. 9 illustrates a top view of the example evaporators.
Figure 10:
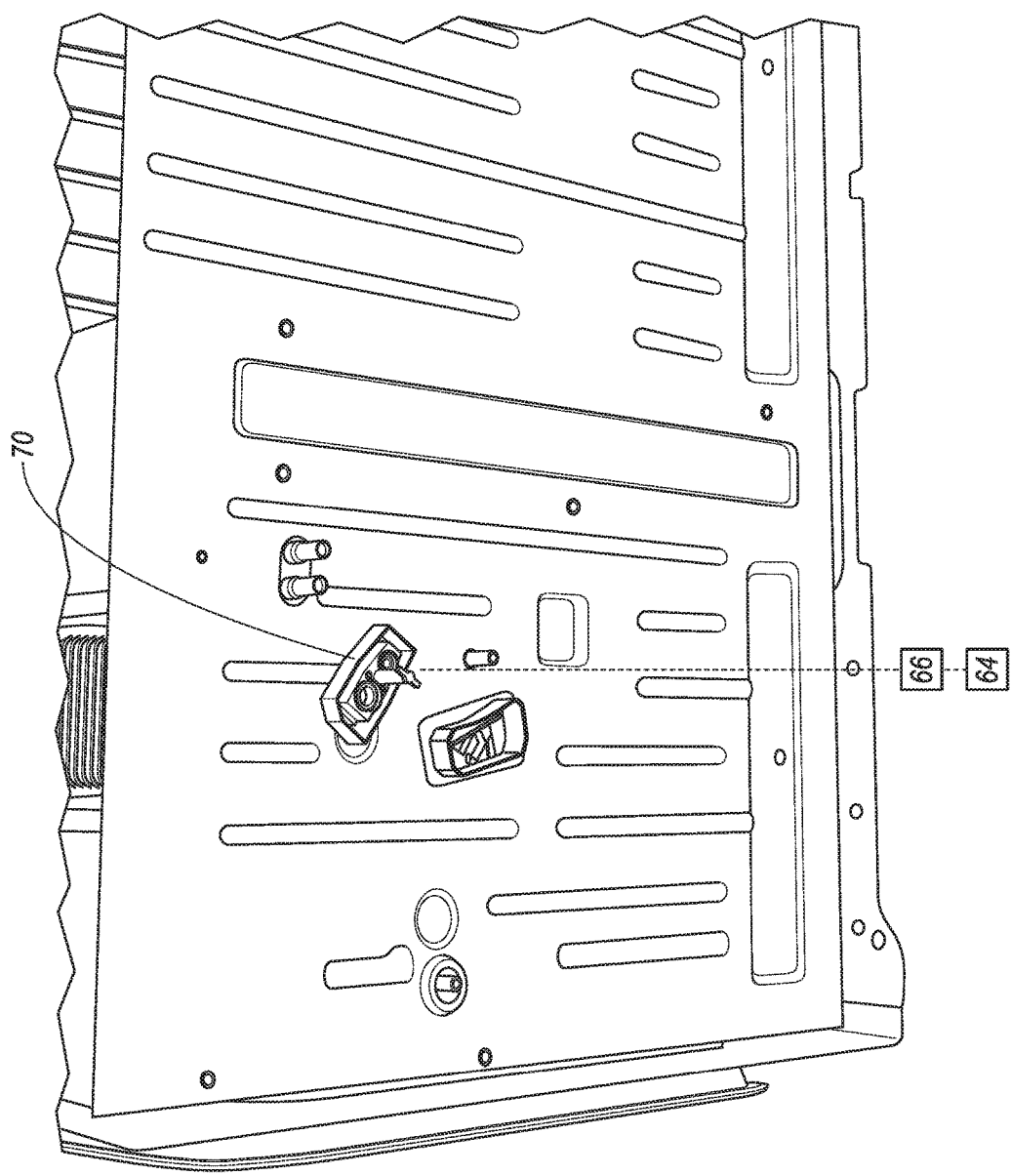
FIG. 10 illustrates a bottom view of the sleeper bunk of FIG. 5.

Referring to FIGS. 9 and 10, the engine-on evaporator 26 is in communication with and receives refrigerant from an engine-on compressor 64 and engine-on condenser 66 through tubing 68 (shown schematically). The tubing 68 runs through an opening in floor panel 70 to an engine-on thermal expansion valve 72 located below the floor panel 70 and in communication with engine-on condenser 66 and engine-on compressor 64 (shown schematically). In one embodiment, the engine-on condenser 66 and the engine-on compressor 64 are disposed in the engine area 12 (see FIG. 1).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An auxiliary HVAC system, comprising:
    an engine-on module configured to provide cooling or heating during an engine-on mode;
    an engine-off module connected to the engine-on module and configured to provide cooling or heating during an engine-off mode;
    a fan assembly disposed in the engine-on module;
    an engine-on evaporator fluidly downstream of the fan assembly and configured to operate during the engine-on mode; and
    an engine-off evaporator fluidly downstream of the fan assembly and configured to operate during the engine-off mode, wherein the engine-on evaporator and the engine-off evaporator are disposed within an evaporator housing in the engine-on module.

2. The auxiliary HVAC system as recited in claim 1, wherein the engine-on module includes discharge openings.

3. The auxiliary HVAC system as recited in claim 1, comprising:
    an engine-off compressor disposed within the engine-off module, wherein the engine-off compressor is in fluid communication with the engine-off evaporator through a suction line.

4. The auxiliary HVAC system as recited in claim 3, wherein the engine-on module includes an engine-on outer housing, the engine-off module includes an engine-off outer housing, and at least a portion of the suction line is outside of both the engine-off outer housing and the engine-on outer housing.

5. The auxiliary HVAC system as recited in claim 1, wherein the engine-off module comprises, within an engine-off outer housing, a condenser and a compressor configured to be powered by an electric power source during engine-off mode.

6. The auxiliary HVAC system as recited in claim 5, wherein the engine-on module comprises, within an engine-on outer housing, a fan assembly, an engine-on evaporator, and an engine-off evaporator, wherein the fan assembly and the engine-off evaporator are configured to be powered by the electric power source during engine-off mode.

7. The auxiliary HVAC system as recited in claim 1, wherein the path of conditioned air is the same for engine-on mode and engine-off mode.

8. An auxiliary HVAC system, comprising:
    an engine-on module configured to provide cooling or heating during an engine-on mode and including an engine-on outer housing;
    an engine-off module connected to the engine-on module and configured to provide cooling or heating during an engine-off mode and including an engine-off outer housing separate from the engine-on outer housing;
    a fan assembly disposed in the engine-on outer housing;
    an engine-on evaporator in a fluid path with the fan assembly and configured to operate during the engine-on mode; and
    an engine-off evaporator in the fluid path with the fan assembly and configured to operate during the engine-off mode, wherein the engine-on evaporator and the engine-off evaporator are disposed within an evaporator housing in the engine-on module.

9. The auxiliary HVAC system as recited in claim 8, wherein the engine-on outer housing includes the evaporator housing.

10. The auxiliary HVAC system as recited in claim 9, wherein the engine-off evaporator is connected to a thermal expansion valve through evaporator piping.

11. The auxiliary HVAC system as recited in claim 10, wherein the thermal expansion valve is disposed outside of the engine-on outer housing and the evaporator housing and provides the refrigerant interface between the engine-on module and the engine-off module.

12. The auxiliary HVAC system as recited in claim 11, comprising an electrically powered compressor assembly disposed within the engine-off outer housing in fluid communication with the engine-off evaporator through a suction line connected to the thermal expansion valve through an opening in the engine-off outer housing.

* * * * *